United States Patent [19]
Okuda et al.

[11] Patent Number: 6,088,713
[45] Date of Patent: Jul. 11, 2000

[54] DATA PROCESSOR FOR RETRIEVING SENTENCE DATA CORRESPONDING TO AN INPUT CHARACTER STRING AND ONE OR MORE SELECTED TEXT HANDLING OPTIONS

[75] Inventors: Katsunori Okuda, Nara-ken; Isamu Haneda, Kyoto-fu; Yoshihiro Shintaku; Kenichi Inui, both of Nara-ken; Masayuki Konishi, Kyoto-fu; Naoki Shiraishi; Chieji Katoh, both of Nara-ken, all of Japan

[73] Assignee: Sharp Kabushiki Kaisha, Osaka, Japan

[21] Appl. No.: 08/047,511

[22] Filed: Apr. 19, 1993

[30] Foreign Application Priority Data

Apr. 20, 1992 [JP] Japan ................................ 4-099951

[51] Int. Cl.$^7$ ........................................ G06F 15/00
[52] U.S. Cl. .................................. 707/534; 707/4
[58] Field of Search .................... 395/146, 144; 364/400, 419.19

[56] References Cited

U.S. PATENT DOCUMENTS

| 4,972,349 | 11/1990 | Kleinberger | 395/144 |
| 5,122,953 | 6/1992 | Uekusa et al. | 364/419.17 |
| 5,274,757 | 12/1993 | Miyoshi et al. | 395/146 |

FOREIGN PATENT DOCUMENTS

| 63-061345 | 3/1988 | Japan . |
| 3-156678 | 7/1991 | Japan . |
| 4-281559 | 10/1992 | Japan . |

OTHER PUBLICATIONS

The Best Book of WordPerfect by Vincent Alfieri Hayden Books, 5$^{th}$ Edition 1988 pp. 304,305,307,399.

*Primary Examiner*—Anton W. Fetting
*Attorney, Agent, or Firm*—Nixon & Vanderhye P.C.

[57] ABSTRACT

If an unnecessary sentence is included in data tabulated at a display, a head address is prepared in a memory region for storing a new data group. A counter m indicating a function and a counter n indicating a data number corresponding to the function are initialized. A determination whether or not the data (Y(m)) is necessary is made for every function (X(m, n)), and the only necessary data is stored in the memory. This operation is performed to check four functions and 100 pieces of data for each of the four functions. When the operation is completed, the resultant data is stored as a set of data in the memory.

15 Claims, 8 Drawing Sheets

```
RETRIEVAL TABULATED DISPLAY FUNCTION

CHARACTER STRING FOR RETRIEVAL
      [ TANAKA __           ]

INPUT CHARACTER STRING FOR
RETRIEVAL
```

| FIRST DATA OF A |
| --- |
| . |
| . |
| LAST DATA OF A |
| FIRST DATA OF B |
| . |
| LAST DATA OF B |
| FIRST DATA OF C |
| . |
| LAST DATA OF C |
| FIRST DATA OF D |
| . |
| LAST DATA OF D |

```
RETRIEVAL TABULATED DISPLAY FUNCTION

CHARACTER STRING FOR RETRIEVAL
         [TANAKA__        ]

OBJECT DATA IS NOT PRESENT
```

FIG.10

| RETRIEVAL TABULATED DISPLAY FUNCTION | | |
|---|---|---|
| A | C | |
| SEIICHI ARIMA | SATOH ELECTRIC | |
| YOSHIO OZAKI | SATOH ELECTRIC | COMP. |
| TOSHIHIKO KISHI | SATOH ELECTRIC | EXECUTIVE DIRECTOR |
| MAMORU SATOH | SATOH ELECTRIC | PRESIDENT |
| KAORU SETO | SATOH ELECTRIC | BUSINESS DEPT. |
| KAZUO TACHIBANA | SATOH ELECTRIC | TECNICAL DEPT. |
| KENICHI CHIBA | SATOH ELECTRIC | |
| MINORU NAMBA | SATOH ELECTRIC | EMPLOYEE |
| TOSHIKAZU MACHIDA | SATOH ELECTRIC | PURCHASE DEPT. |
| MOTOHIKO MORI | SATOH ELECTRIC | |

DATA PROCESSOR FOR RETRIEVING SENTENCE DATA CORRESPONDING TO AN INPUT CHARACTER STRING AND ONE OR MORE SELECTED TEXT HANDLING OPTIONS

BACKGROUND OF THE INVENTION

1. Field of the Invention

The present invention relates generally to data processors, and more specifically, to a data processor permitting character strings to be readily processed.

2. Description of the Related Art

Data processors for word processors, personal computers or the like have a function of automatically locating a character string in data stored therein by designating the character string for retrieval.

In conventional data processors, when a desired character string for retrieval is designated, the sentence including the character string is automatically retrieved, but it is not possible to tabulate the entire sentence for confirmation. Therefore, one does not have quick access to desired object data. Easy arrangement of data such as deleting unnecessary data from tabulated data displayed to produce desired data can not be carried out.

SUMMARY OF THE INVENTION

It is therefore one object of the invention to give a user quick access to desired data stored in a data processor.

Another object of the invention is to readily perform arrangement of data in a data processor.

Yet another object of the invention is to provide a method of displaying data permitting a user quick access to desired data in a plurality of stored data.

The invention is achieved by a data processor including a memory for storing sentence data, a retriever for retrieving a specific character string included in the sentence data stored in the memory, a display for displaying all the sentences including the retrieved character string, a selector for selecting a desired sentence among the displayed sentences, and means for displaying the entire selected characters on display means.

In the sentence data stored in the memory, the sentences including the specific character string are tabulated for display, among which the selected desired sentence is entirely displayed, and therefore the content of object data can quickly be known.

Preferably, the data processor further includes a deletion unit for deleting unnecessary sentences selected by the selector.

Unnecessary sentences are selectively deleted by the selector, and therefore data can readily be arranged in the data processor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the invention will be described in conjunction with the accompanying drawings.

Figure 1:
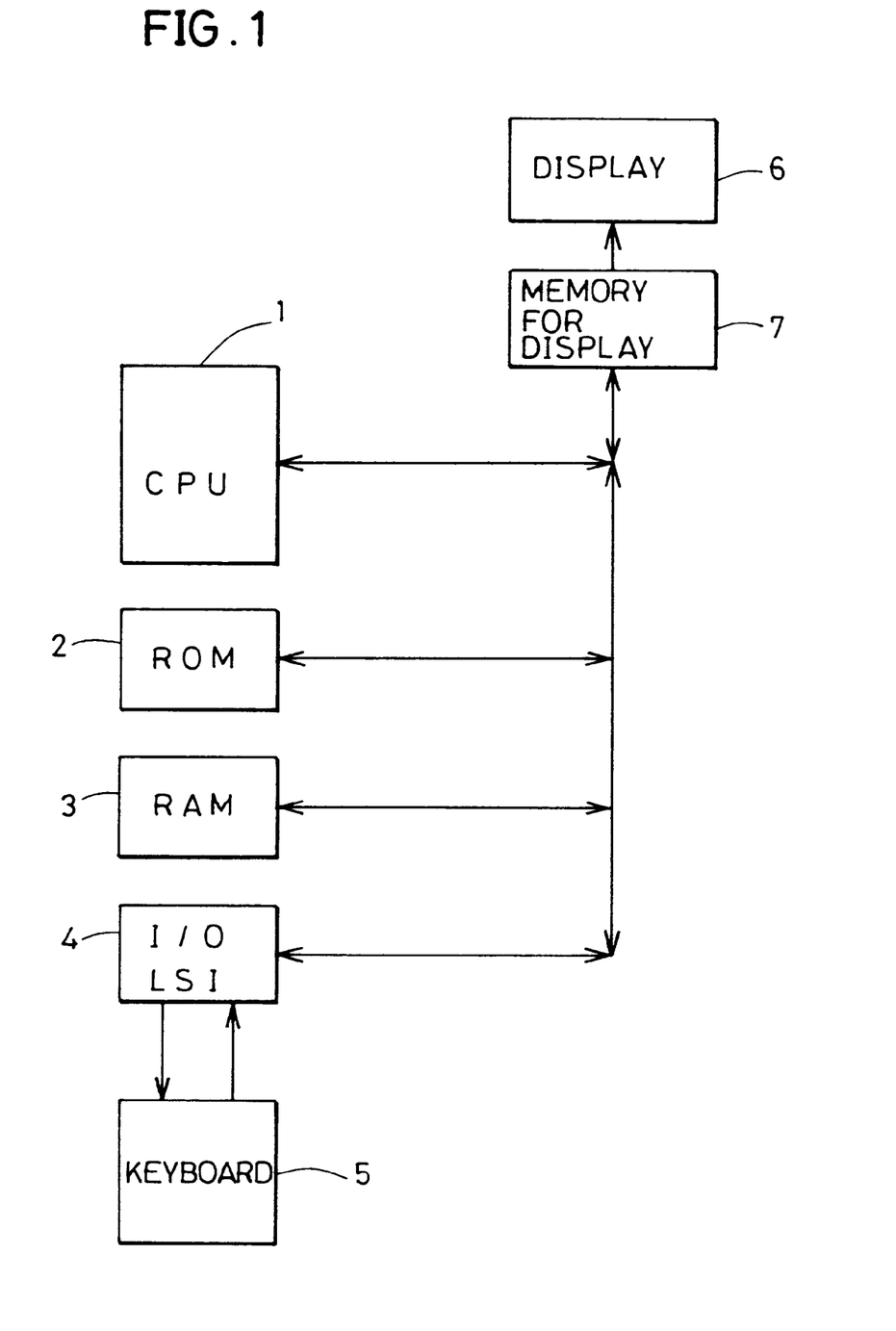
FIG. 1 is a block diagram showing an essential part of a data processor according to the invention.

Referring to FIG. 1, a data processor includes CPU (Central Processing Unit) 1, an ROM (Read Only Memory) 2 in which control programs for the processor are prestored, an RAM (Random Access Memory) 3 used as area for storing data or the working of CPU 1, an I/O device LSI 4 for connecting an input device, a keyboard device 5 used as the input device, a display 6 formed of, for example, a liquid crystal display and a display memory.

CPU 1 receives signals indicating the states of devices connected thereto through I/O device LSI 4 and outputs data to those devices. In keyboard device 5, keys are arranged in a matrix, and the key which is pressed is determined through I/O device LSI. When CPU 1 writes data in display memory 7 for display, a display corresponding to the data is made on display 6.

Figure 2:
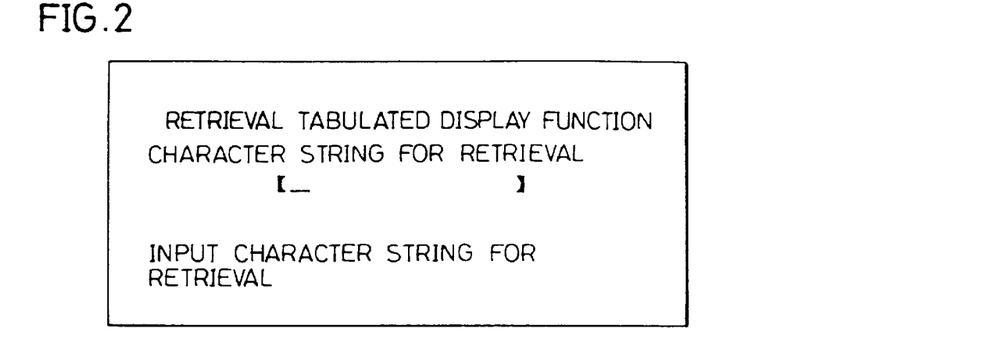
FIG. 2 is a representation showing a display example when a retrieval function is selected.
Figure 3:
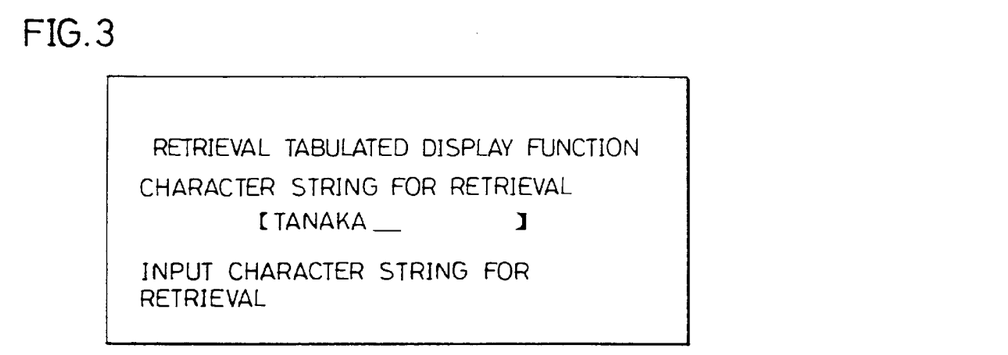
FIG. 3 is a representation showing the state of an example of characters for retrieval being input.
Figure 4:
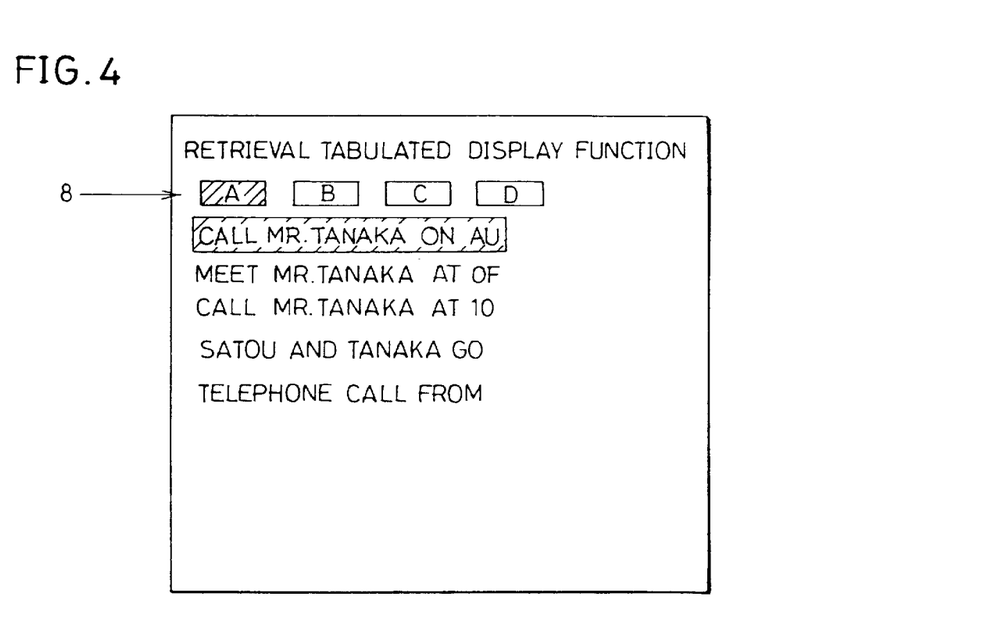
FIG. 4 is a representation showing how data including an object character string is tabulated for separate functions.

Now, an operation of one embodiment will be described. FIG. 2 illustrates an example of display when a retrieval function is selected on keyboard device 5 in order to locate data including a certain character string. FIG. 3 illustrates an example of a character string for retrieval being input. FIG. 4 illustrates an example of a tabulated display in which data including an object character string is displayed for separate functions by pressing an execution key on keyboard device 5 (not shown) in the state shown in FIG. 3. In this example, five pieces of object data corresponding to function A are displayed.

In FIG. 4, the data processor according to the embodiment has four functions A–D each of which is indicated with an icon 8. Tabulated data for which function is displayed is known from icon 8 being reversed. In this example, the function A is selected.

For the functions A, B, C, and D, for example, schedule calendar function, telephone directory function, memo function, and name card maintenance function are considered.

In order to switch between the functions, a desired function is selected by a left/right cursor key (not shown) on keyboard device 5. If a character string for retrieve is input and there is no corresponding object data including the character string, nothing is displayed on display 6. The content tabulated for display includes at most the head 20 characters of each stored data.

Figure 5:
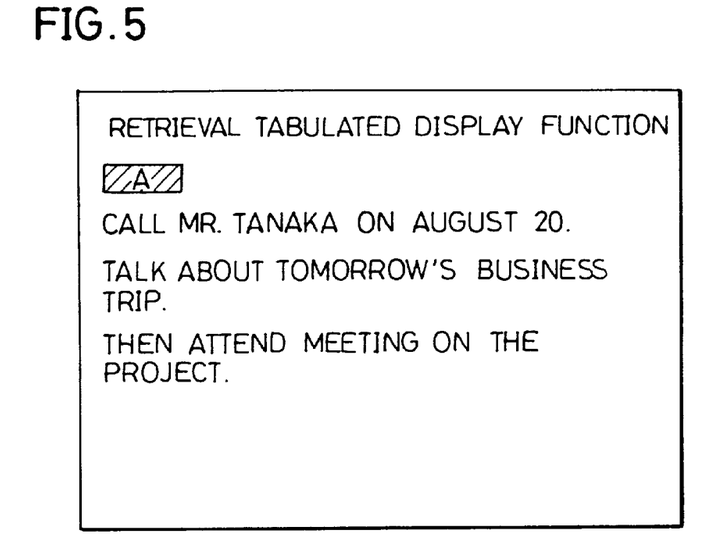
FIG. 5 is a representation showing how one item data is displayed.

Referring to FIG. 4, the head item is highlighted in this example. If the execution key (not shown) of keyboard device 5 is pressed in this state, the display state temporarily changes from the tabulated display of the plurality of data to contents corresponding to the selected item. One example of such display is shown in FIG. 5.

In order to return to the original tabulated display from this state, a C key (Clear key) (not shown) on keyboard device 5 is pressed. Thus, the display returns to the state shown in FIG. 4.

If another item content is selected in FIG. 4, an up/down cursor key (not shown) on key board device 5 is pressed. A highlighted item changes in response to this. If the highlighted item is above or below the picture plane, the display scrolls within the range of data.

Figure 6:
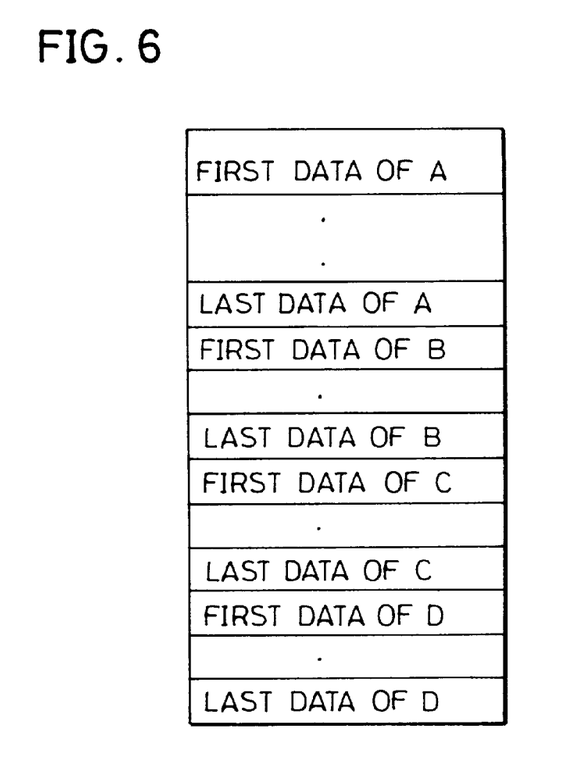
FIG. 6 is a representation showing one example of the structure of data stored in an RAM in a data processor.

FIG. 6 is a representation showing one example of the structure of data stored in an RAM 3 in the data processor according to the invention. The data is classified corresponding to four separate functions, and each function data is stored sequentially from the head.

When a character string is retrieved, it is checked whether or not the object retrieval character string is present in the data of each menu function. If the retrieval object character string is present, a tabulated display can be achieved by sequentially storing the numbers attached to data. An operation from input of the character string for retrieval until its tabulated display will be described in conjunction with the schematic flow chart in FIG. 7.

Figure 7:
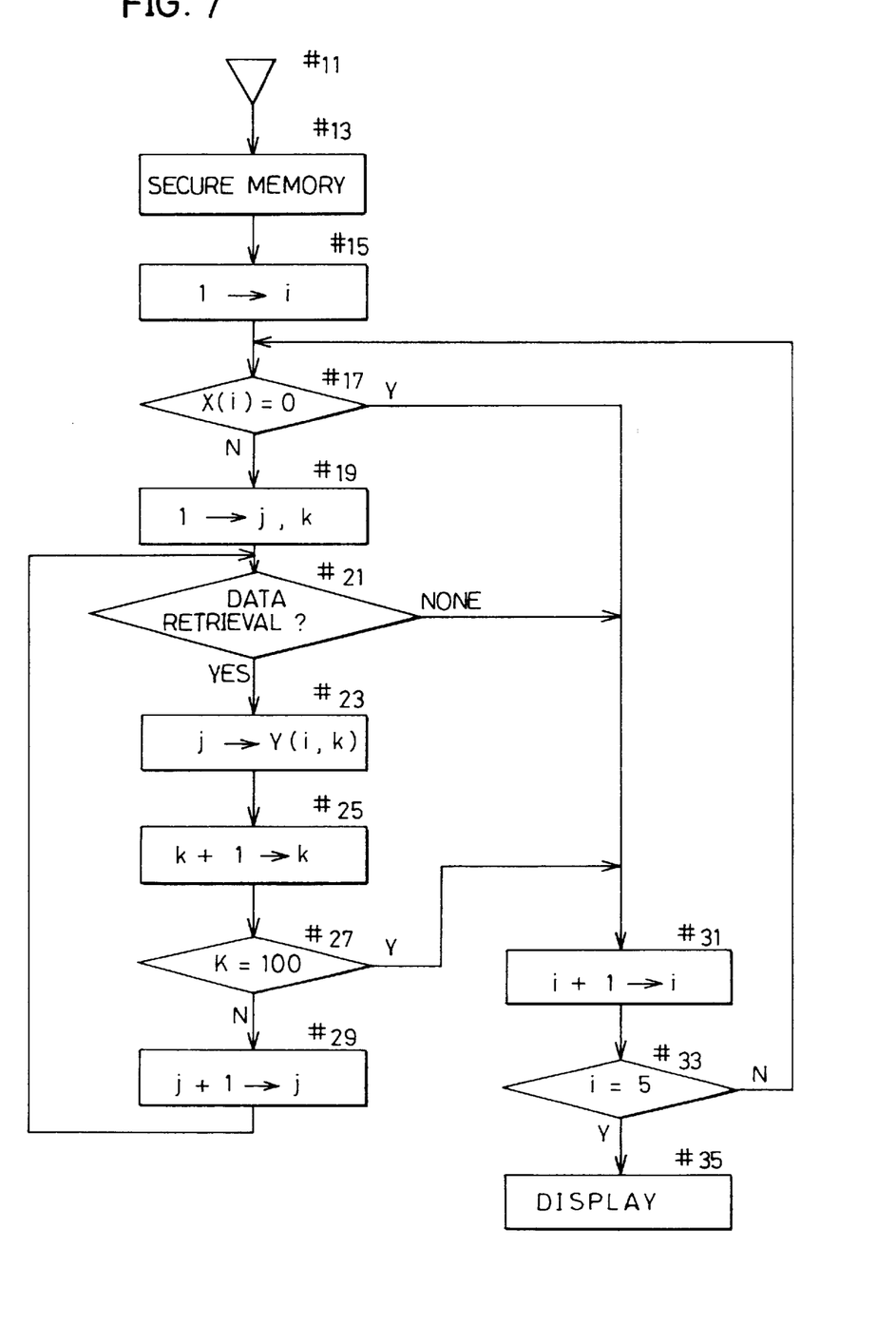
FIG. 7 is a flow chart for use in schematic illustration of an operation from input of a character string for retrieval to its tabulated display.

In entry #11, a character string for retrieval and a function in which object data is to be subject to retrieval are determined. If the data representing function X(1), X(2), X(3), or X(4) is "1", the function is an object one. A 0 indicates a non-object. These data representing the function correspond to the functions A, B, C, and D, respectively, and indicate whether the function is an object or not.

Then, a memory for storing which is object data to be tabulated among function data selected in #13 is secured. The memory addresses are Y(1, 1), . . . , Y(1, 99), Y(2, 1), . . . , Y(2, 99), Y(3, 1), . . . , Y(3, 99), Y(4, 1), . . . , Y(4, 99). The maximum number of data to be an object for a tabulated display by one function is 99.

These addresses are used when all these four function data are objects, and if only the functions A and C are objects, memory addresses Y(1, 1), . . . , Y(1, 99), and Y(3, 1), . . . , Y(3, 99) are secured. Y(1, n), Y(2, n), Y(3, n), and Y(4, n) are data for the functions A, B, C, and D, respectively. (n=1, . . . , 99).

In order to retrieve the maximum four function data, a counter i is set to 1 (#15.) It is checked in #17 whether a function indicated by i is an object or a non-object. More specifically, if the value of X(i) is 0, it indicates a non-object, and therefore the program proceeds to #31. Then, j and k are initialized (j, k=1) for the count of object data (#19).

It, is checked whether or not data indicated by counters i and j is present (#21). More specifically, if the data is not present, the data retrieval for this function is completed, and the program proceeds to #31. j indicates the order of the data being retrieved in data representing the function indicated by i. Furthermore, k indicates number assigned to the memory decided in #13, and stores the number assigned j of retrieved object data.

In #23, the value of j at the time is sequentially stored in the memory secured in step #13. The storage memory is a memory indicated by i and k. If, for example, the head data of function A is object data, i=j=k=1 holds, and therefore 1 (=j) is stored in the memory of Y(1, 1).

Then, k=k+1 is set, and the address of a memory to store data next is updated (#25).

When k reaches 100, since there is not a memory for storing tabulated displayed data (Y in #27), the program proceeds to #31.

In #29, j=j+1 is set, and the number for the next data is updated. The program then returns to #21.

In #31, i=i+1 is set, and then a preparation for retrieving the next function data is performed. When i is equal to 5, since it indicates that retrieval of the four function data is completed (Y in #33), the program proceeds to #35. Otherwise (N in #33), the program returns to #17.

In #35, data is tabulated according to the content of the memory secured in #13.

Figure 8:
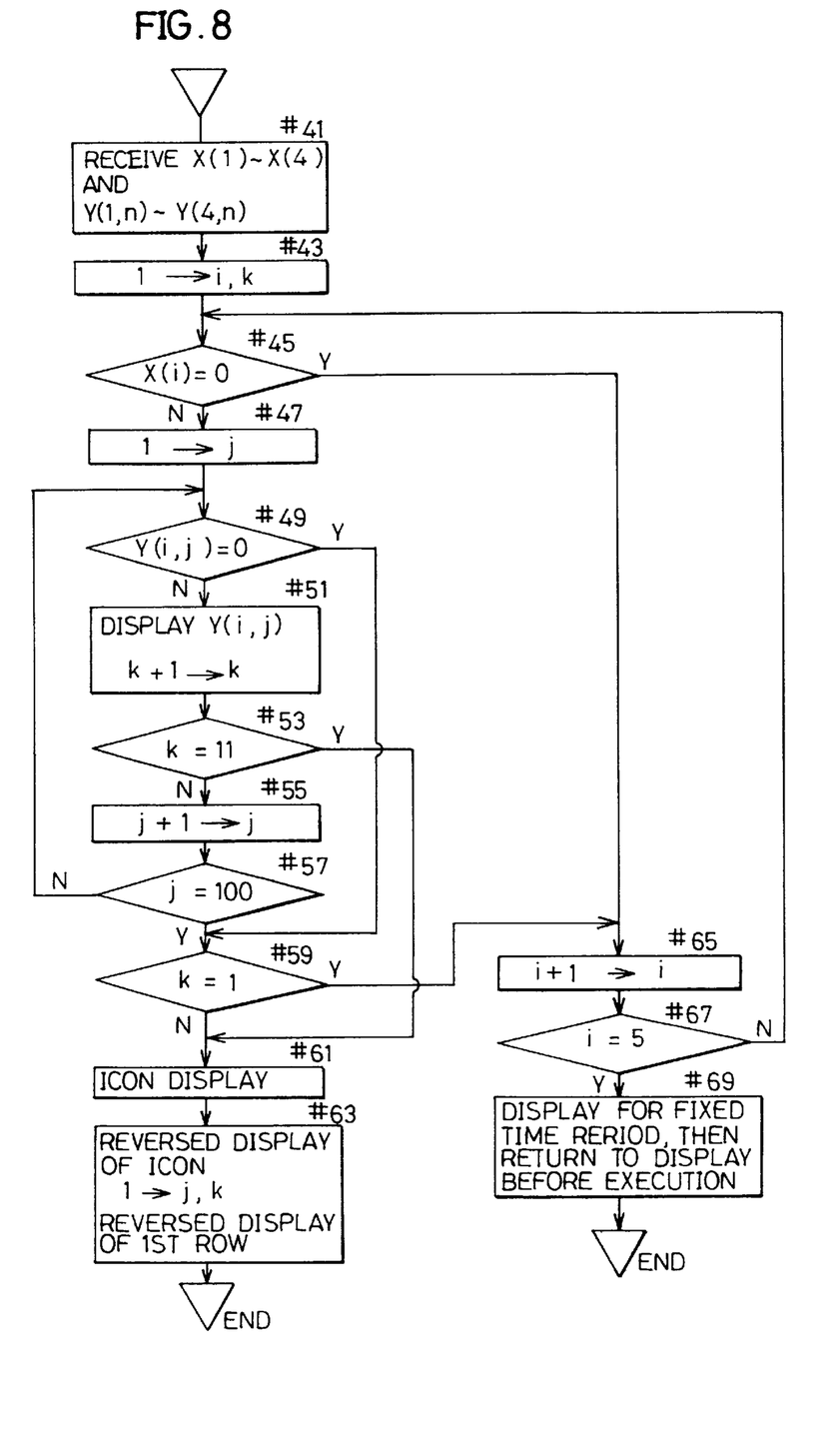
FIG. 8 is a flow chart for use in schematic illustration of how tabulated display is performed.

FIG. 8 is a flow chart for use in schematic illustration of an operation for tabulating data. Referring to FIG. 8, the flow chart will be described.

In #41, memories X(1)–X(4), and Y(1, n)–Y(4, n) in the flow chart shown in FIG. 7 are accepted. (n=1, 99).

Then in #43, counter i for counting four function counters is initialized. Each counter k four counting rows to be displayed is initialized (k=1).

Then, in #45, it is checked whether or not the function indicated by i is an object. If it is a non-object (Y in #45), the program proceeds to #65.

If the data is determined to be an object in #45, the data order counter j of the function is initialized in #47 (j=1). Then, it is checked if the memory Y(i, j) indicated by i and j is 0. If it is 0 (Y in #49), since there is not any data, the program proceeds to #59. If it is not 0 (N in #49), the data indicated by Y(i, j) is displayed in a row at the k-th row in the display and k=k+1 is set. If only a row of the data is displayed, the form of display sometimes differs depending upon the function. The head 10 characters of the function data for one item display may be displayed.

In #53, it is checked whether or not k is equal to 11. More specifically, it is checked if 10 pieces of data have been displayed. If k is equal to 11 (Y in #53), the program proceeds to #61. If k does not reach 11 in #53 (N in #53), j=j+1 is set for preparing the next data table.

Then, it is determined whether or not j is equal to 100 in #57. If j is equal to 100, it indicates that there is not any more data. If j is not equal to 100 (N in #57), the program proceeds to #49.

Processing of the object data in the data of the function indicated by i has been completed by the aforementioned operation. Then, it is checked whether or not the object data is present in the function indicated by i. If k is equal to 1 (Y in #59), it indicates that data even for a row is not displayed, and therefore the program automatically proceeds to #65 for displaying the next function data.

If the object data is present in the function indicated by i (N in #59), an icon is displayed (#61). The icon displays only the functions whose data X(1)–X(4) are not 0. However, if a non-selected icon is present inbetween, the display positions of icons indicating functions are displayed with the non-selected icon therebetween. It is noted that the icon is displayed in a frame.

Then, the icon indicated by i is reversed for display, and it is indicated that the data of the function indicated by i is displayed (#63). j=k=1 is set, and the first row is reversed for display. Then, tabulated display after execution is completed.

Figure 9:
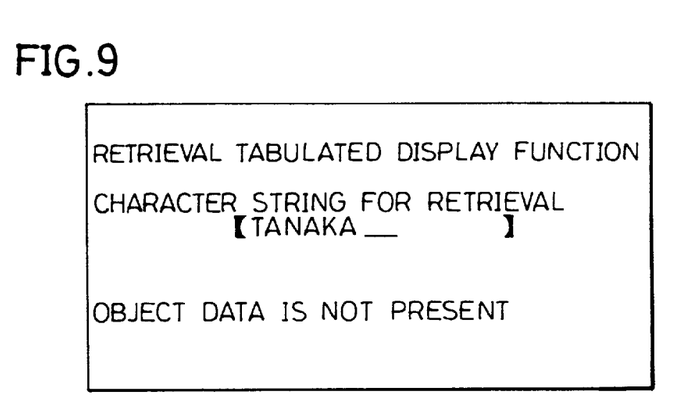
FIG. 9 is a representation showing a display state when object data is not present.

In #65, since there is not the object data in the function indicated by i, i=i+1 is set in order to search the next function data. This is repeated until i is equal to 5 (#67). If i is equal to 5 in #67 (Y in #67), it indicates that there is not the object data in all the functions, the content shown in FIG. 9 is displayed for a fixed time period, and then the program returns to the state for inputting a character string for retrieval in FIG. 3 before the execution.

Figure 10:
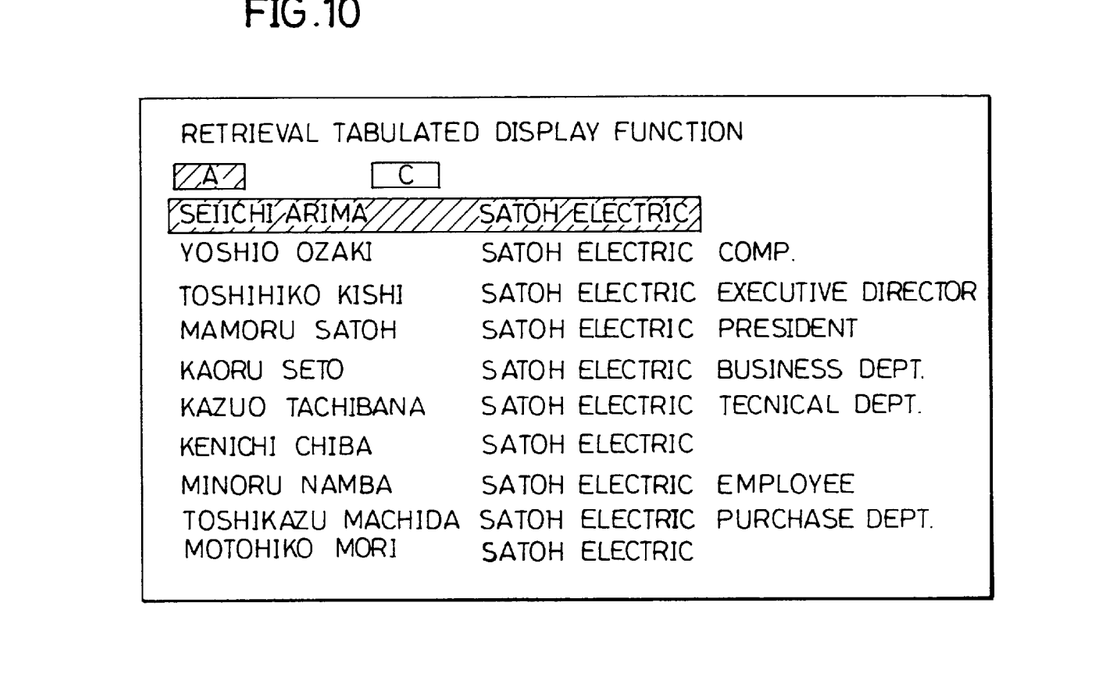
FIG. 10 is a representation showing how a tabulated display is performed by way of illustration.

FIG. 10 illustrates an example of display of the result of executing tabulated display of the data retrieved, which is described in conjunction with FIG. 8. As opposed to the case of FIG. 4, since only the functions A and C are selected, only two icons are displayed for A and C. The data of the functions whose icons are reverse highlighted are displayed. Switching between the functions is performed by pressing the left/right cursor (not shown).

Figure 11:
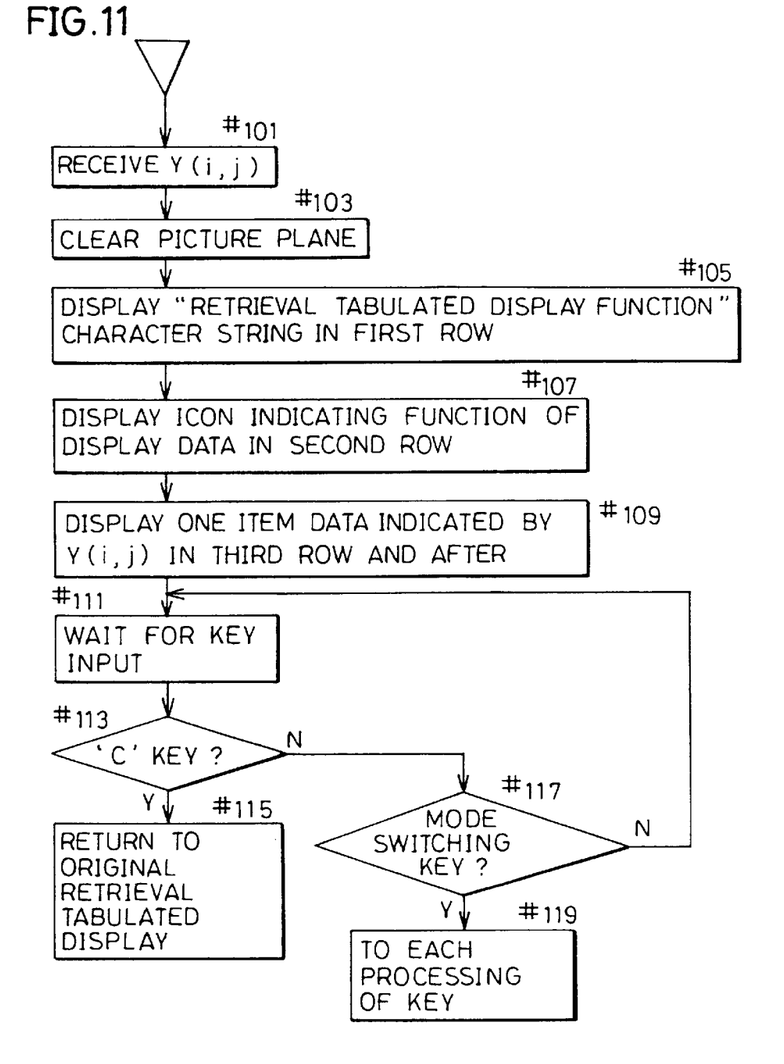
FIG. 11 is a flow chart for use in illustration of changing from tabulated display to one item display.

FIG. 11 shows a flow from the retrieval tabulated display shown in FIG. 4 to one item display of a reversed item by pressing the execution key. The picture plane of the one item display is assumed to be the same as shown in FIG. 5.

Y(i, j) indicating the content of the reversed item is received (#101). i (=1–4) indicates a function (A, B, C, D), and a number indicating data is in Y(i, j). Then, the picture plane is cleared (#103).

"RETRIEVAL TABULATED DISPLAY FUNCTION" in the first row shown in FIG. 5 is displayed (#105). An icon indicating a function is reversed for display in the second row (#107). Since i=1 here, A is displayed. After the third row, the data of the function indicated by Y(i, j) is displayed (#109). If the data is too large to display in the picture plane, data within the picture plane is displayed (see FIG. 5). After one item data display, a key waiting state is reached (#111).

When the key is pressed, a determination whether or not the pressed key is C key is made at this point (#113). If the answer is "N", the program proceeds to #117. If the pressed key is determined to be C key in #113, the program returns to the retrieval tabulated display before entering the flow (#115).

If the pressed key is a key other than C key i.e. keys for moving out from a retrieval tabulated display function mode (these keys are placed on key board device 5) such as a power supply "off" key, and function switching key (for example, a display/input selection key for the function A) (Y in #117), the program proceeds to #119 to perform a processing according to the key pressed in #113, and otherwise returns to #111.

Now, the case in which unnecessary data is deleted from tabulated data will be described. In FIG. 10, in order to delete unnecessary data from the tabulated display, an up/down cursor provided on keyboard device 5 is pressed. The reversed display item moves and if the reversed item moves above or below the picture plane, the picture plane scrolls. However, there is not any more data, the highlighted item does not move. Unnecessary items are determined and displayed, and the data is deleted from the tabulated display by pressing the deletion key on keyboard device 5. However, the data is not deleted from RAM 3.

Thus, after extracting only necessary items, the report producing key (not shown) provided on keyboard device 5 is pressed in order to form the data after the extraction into one data. As a result, the object data can be continued in the order of tabulated display to form one data. It is noted that the order of continuation is the order of A, B, C, and D. The resultant one data is stored in, for example, the function D, and the data is displayed.

Figure 12:
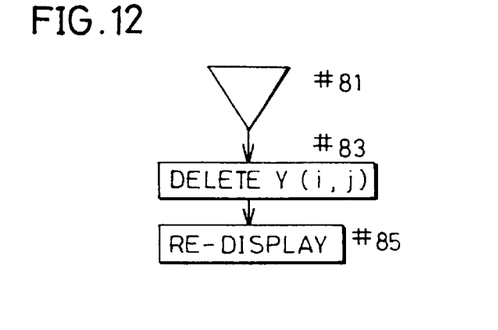
FIG. 12 is a flow chart for use in illustration of an operation when one item is excluded in the state of tabulated display.

FIG. 12 is a flow chart for use in schematic illustration of the case in which the above-described one item is deleted from the tabulated display produced according to the flow of FIG. 8. In the entry in #81, information obtained by the flow chart of FIG. 8 is succeeded as it is. It is assumed that the item indicated by i and k is reversed, and the deletion of the item from an object for tabulated display is to be executed.

It is noted that i indicates the function of data displayed, and the value fluctuates with the movement of the left/right cursor. More specifically, when i is equal to 1, the left cursor is invalid, but if the right cursor is pressed, i+1=1 is set (i=2). If X(i) is not 0 at that time, the reversed display of the present icon is returned, and the icon indicated by i is reversed for display and at the same time the data of the function is tabulated. At that time, a content to be displayed ranges to the maximum 10 pieces (0 in some cases).

If X(i) is equal to 0 and i is equal to 4, since it indicates there is not any more function, the original i does not change and therefore the display is not subject to any change after all. If i is not equal to 4, the above-described checking operation is repeated.

j indicates the number for a reversed item and the number of rows from the first row of the display. When the up/down cursor is pressed, j and k are incremented/decremented by 1, and the resultant row is reversed for display. When k is equal to 1 and the up cursor is pressed, if j is not 1, the picture plane scrolls, setting j to j−1, but k remains to be 1. If j is equal to 1, no operation is made.

Similarly, when k is equal to 10, data of j+1 is not present or j is 99 after pressing the down cursor key, no operation is performed. Otherwise, the picture plane is scrolled up and j+1→j is set (k remains to be 10).

In #83, in order to delete the value of Y(i, j), the values after Y(i, j) are moved to the upside by 1. More specifically, Y(i, j+1)→Y(i, j), Y(i, j+2)→Y(i, j+1), . . . , Y(i, 99)→Y(i, 98), 0→Y(i, 99).

In #85, the data from the k-th row is once again displayed. At that time, if the excluded item is at the last of object data, since the k-th row becomes an empty row, the row before the k-th row is reversed for display. Therefore, when k is equal to 1, there is not object data, and therefore nothing is displayed and no item is reversed. The display processing after excluding the unnecessary data is thus completed.

Figure 13:
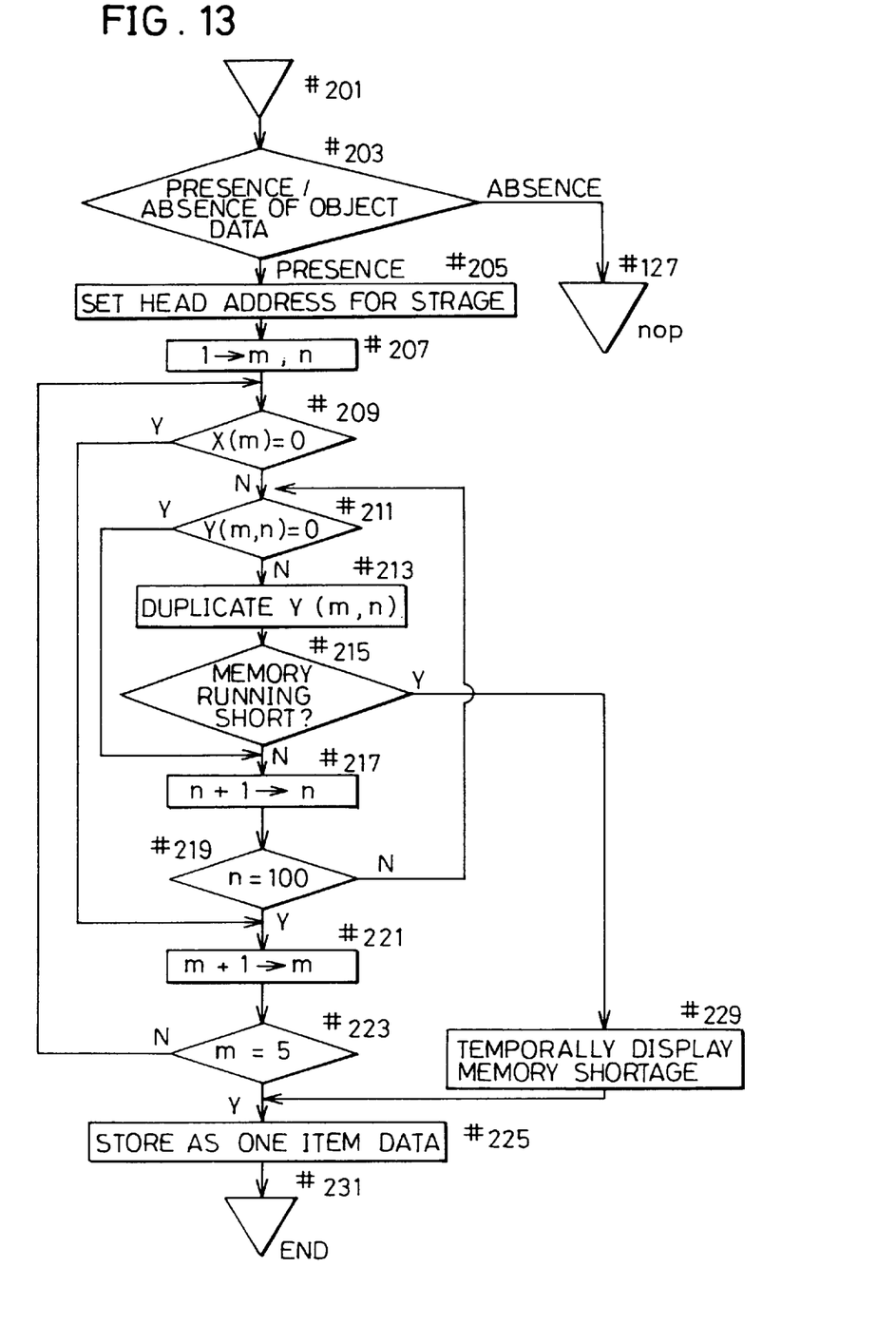
FIG. 13 is a flow chart for use in illustration of an operation when a report producing key is pressed.

Now, an operation when the report producing key (not shown) provided to keyboard device 5 will be described in conjunction with the flow chart in FIG. 13 showing its content.

201 is an entry, and the memories and the values of variables in FIG. 8 or FIG. 12 are determined. It is checked whether or not object data is present in the tabulated display (#203). This is because in some cases the object data is excluded by the above-described deletion processing. If there is no the object data, no operation is performed and the program returns to the processing before execution (#227).

If the object data is present in #203, a head address for storing data after producing a report in the function D is prepared (#205). Then, counters m and n are initialized (#207). m indicates the order of functions, and n is a counter indicating the order of the functions.

Then, it is checked whether or not the function indicated by m is an object (#209). If X(m) is equal to 0 (Y in #209), it indicates a non-object, and therefore the program proceeds to #121. If X(m) is the object (N in #209), it is checked whether or not Y(m, n) is 0 (#211). If Y(m, n) is 0 (Y in #211), the program proceeds to #217. If Y(m, n) is not 0 (N in #211), the data of Y(m, n) is duplicated in a data region for the function D in RAM 3. The duplication address at the time is a address decided in #205, and the next address becomes a new storage address after the storage.

If the memory capacity runs short (Y in #215), the program proceeds to #229 and indicates the information. If the memory capacity does not run short (Y in #215), n is set to n+1 (#217), and it is determined whether or not n is equal to 100 (#219). If n is equal to 100 (Y in #219), it indicates that there is not any more data in the function, and the program proceeds to #221. If n is not equal to 100 (N in #219), the program returns to #211.

Since the function data indicated by m is duplicated in the function D in #223, m is added with 1 in order to duplicate the data of the next function. The operation is repeated until m is equal to 5 (#223). If m is equal to 5 (Y in #223), it indicates that all the object functions are duplicated, and therefore the program proceeds to #225 for terminating the processing. Then, the data duplicated in the function D is formally stored as one item data (#225). The data is then subjected to the one item display function. The processing of report producing execution is thus completed (#231).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processor, comprising:

a memory divided into plural sections, each section being associated with a specific data processing function, for selectively storing sentence entries in each of the memory sections in accordance with the specific data processing function used to generate each sentence entry;

an input device operated by a user to input a character string and select one or more the specific data processing functions;

a display for displaying the input character string and the selected data processing functions;

a computer for performing the tasks of:

locating and retrieving an initial portion of each sentence entry that includes the character string and that is stored in the memory section corresponding to the selected one or more specific data processing functions;

displaying on the display the retrieved initial portions of sentence entries; and in response to the user selecting one of the displayed initial portions of sentence entries, displaying on the display a complete sentence entry corresponding to the selected one of the displayed initial portions of sentence entries.

2. The data processor recited in claim 1, wherein the user selects one of the sentence entries and produces new sentence data which is then stored in a corresponding section of the memory.

3. The data processor recited in claim 1, wherein the specific data processing functions include a schedule or calendar function.

4. The data processor recited in claim 1, wherein the specific data processing functions include a telephone directory function.

5. The data processor recited in claim 1, wherein the specific data processing handling functions include a memorandum function.

6. The data processor recited in claim 1, wherein the specific data processing handling functions include a name card maintenance function.

7. A data processor in accordance with claim 1, wherein the specific data processing functions include a scheduling function, a telephone directory function, a memorandum function, and a name card maintenance function.

8. The method comprising the steps of:

classifying strings of character data as corresponding to one of a plurality of different character processing functions;

storing the classified input character data in a corresponding one of plural memory areas, each memory area being specifically allocated to one of the different character processing functions;

inputting a sequence of characters;

selecting one or more of the different character processing functions to be associated with the input sequence of characters;

retrieving from the one memory area corresponding to the selected character processing function initial portions of one or more complete character strings corresponding to the input sequence of characters;

displaying the retrieved initial portions;

selecting one of the displayed initial portions; and displaying the complete string of characters corresponding to the selected one of the displayed initial portions.

9. The method according to claim 8, further comprising:

displaying different character processing functions which may be selected to modify the initial portions of one or more character strings to be retrieved.

10. The method according to claim 8, further comprising:

editing the displayed complete character string, and storing the edited character string in one of the memory areas corresponding to the selected character processing function.

11. The method according to claim 8, wherein the character processing functions include a schedule or calendaring function.

12. The method according to claim 8, wherein the character processing functions include a telephone directory function.

13. The method according to claim 8, wherein the character processing functions include a memorandum function.

14. The method according to claim 8, wherein the character processing functions include a name card maintenance function.

15. The method according to claim 8, wherein the different character processing functions include a scheduling function, a telephone directory function, a memorandum function, and a name card maintenance function.

* * * * *